Dec. 17, 1946. R. M. HARMON 2,412,885
SHOCK ABSORBER
Filed Oct. 14, 1944
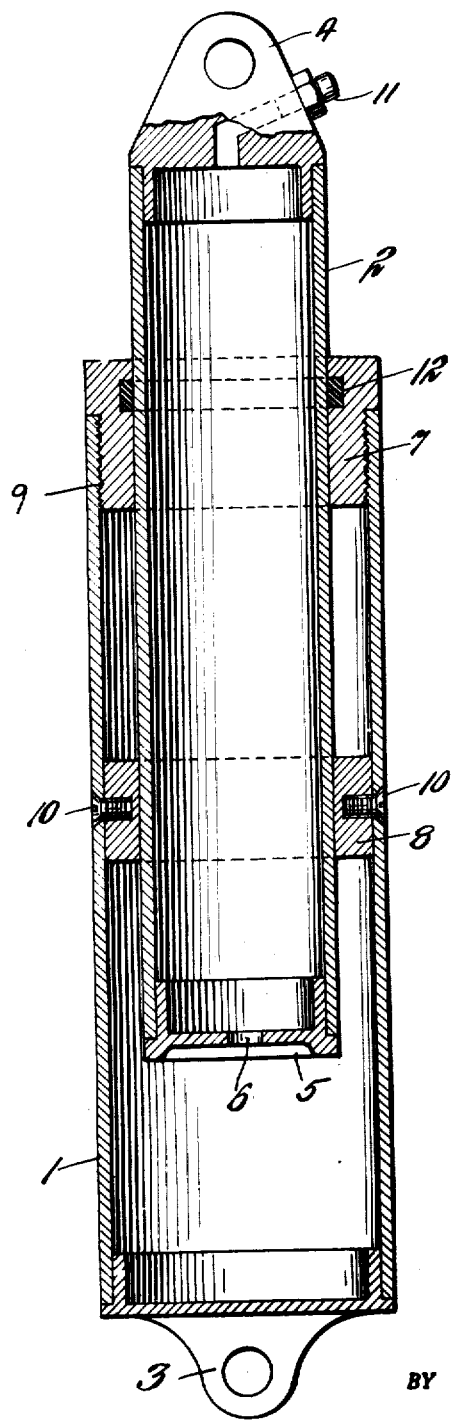
INVENTOR.
RALPH M. HARMON
BY
Philip S. McKean.
ATTORNEY Patented Dec. 17, 1946

2,412,885

UNITED STATES PATENT OFFICE 2,412,885

SHOCK ABSORBER

Ralph M. Harmon, Wichita, Kans., assignor to Beech Aircraft Corporation, Wichita, Kans., a corporation of Delaware Application October 14, 1944, Serial No. 558,755

2 Claims. (Cl. 188—88)

The invention here disclosed relates to shock absorbers, and particularly to shock absorbers of the type employed in aircraft landing gear.

Objects of the invention are to provide shock absorbing mechanism of strong but light weight construction and arranged to effectively carry the bending stresses to which such devices are subjected.

Other objects of the invention are to simplify and reduce the cost of manufacture and assembly.

Other desirable objects and the novel features by which the purposes of the invention are attained are set forth or will appear in the course of the following specification.

The drawing accompanying and forming part of the specification illustrates a present practical embodiment of the invention. Structure, however, may be modified and changed as regards the present disclosure, all within the true intent and broad scope of the invention as hereinafter defined and claimed.

The single figure in the drawing is a longitudinal sectional view of a present commercial embodiment of the invention.

In this view the barrel or cylinder is designated 1 and the tubular piston operating therein, 2.

The outer or closed ends of these parts are suitably equipped for attachment between the relatively movable parts of the aircraft landing gear or other apparatus to which the mechanism is applied.

In the example, the closed end of the cylinder carries a fitting 3 perforated to receive a mounting bolt, and similarly the closed end of the piston carries a fitting 4 perforated for reception of a bolt or other fastening.

The inner end of the piston carries a cap or ring 5 open at the center at 6 for passage of air and oil or other mediums that may be employed as the cushioning and shock absorbing materials.

The external surface of the tubular piston is smoothly finished, usually centerless ground and polished, and in the structure shown the piston is of the same, single diameter its full length. This enables simple, inexpensive machining and finishing operations on the piston.

The piston, instead of having a sliding engagement its full length in the cylinder or having a head in sliding engagement in the cylinder, is slidingly guided and supported by special bearing lands positioned and proportioned to best carry the loads and stresses to which the parts are subjected.

In the illustration, one bearing land 7 is located at the outer end of the barrel and a second bearing land 8 is provided at an intermediate point, slightly beyond mid-length of the cylinder.

These spaced bearing lands may be integral portions of the cylinder or they may be separately formed and then integrated with the cylinder as by welding, brazing, soldering, riveting, bolting or screw fastening.

In the illustration the outer or end bearing land is indicated as having a screwed connection at 9 in the end of the cylinder and the intermediate bearing land is shown as secured at a selected intermediate position in the cylinder by screw fastenings 10.

This construction, with the piston of smaller diameter and free and clear of the inner surface of the barrel and the only engagement between the barrel and piston taken by interposed bearing lands eliminates need for precision machine work and time consuming finishing operations on the inner surface of the barrel. As the piston engages only the inner surfaces of the two bearing elements 7, 8, only the inner surfaces of these members need be accurately finished, such as to the extent of honing and polishing, to match the finish of the piston.

Where as is usually preferred, the bearing lands 7 and 8 are separately formed ring elements, these can be readily machined at reasonable cost, separate and apart from the barrel and then after proper finishing, be assembled and secured in their proper positions in the barrel. The piston, being of the one continuous diameter, can be assembled by simply passing it through the spaced outer and inner bearings of the cylinder, and disassembly can be as readily accomplished, in reverse manner.

The piston is shown as having an attachment 11 for filling and emptying and a packing is conventionally indicated at 12 in the outer bearing land, it being appreciated that these may be of any standard or acceptable designs and located in either or both of the aforementioned lands.

The novel construction disclosed enables accurate calculation of bending stresses in the piston and efficiency in a strength-weight ratio. Little or no internal machining in the cylinder is required. The bearing lands can be made up as prefinished rings and be inserted and mechanically secured in proper position in the barrel at much less cost and with more efficient operation than could be accomplished with internal boring and honing operations on the barrel. The screw mounting of the bearing lands illustrated enables ready removal and replacement of these parts if they should become worn or injured. This replaceability of the inner, intermediately located bearing is of advantage also to provide for replacement of such a bearing land with one of greater or less width or located in a different intermediate position for taking care of different bearing loads or other variables.

While of particular importance for shock struts and other forms of shock absorber constructions, it will be realized that the invention is adapted to other purposes, such as to hydraulic actuators for aircraft and the like. The specification and claims should be read accordingly.

I claim:

1. In a shock absorber or hydraulic actuator for aircraft of the like, an arrangement comprising a barrel having open and closed ends and external attaching means at the closed end, a tubular piston having open and closed ends and operating with the open end within the open end of the barrel and forming therewith a variable capacity compression and expansion chamber for contained liquid and air, said piston having external attaching means at the closed end of the same, said piston being of less diameter and operating clear of the inner surface of the barrel and bearing lands for the piston fixedly secured in said barrel at the outer, open end and at an intermediate point in the length of the barrel, said bearing lands having smooth finished internal bearing surfaces of fundamentally the same diameter and of less diameter than the internal diameter of the barrel and the tubular piston having a corresponding smooth finished bearing surface of the same diameter and slidingly operating in said finished internal surfaces of said fixedly supported and spaced bearing lands, whereby the only bearing surfaces are the external surface of the piston and the internal surfaces of said fixedly spaced lands.

2. In a shock absorber or hydraulic actuator for aircraft or the like, an arrangement comprising a barrel having open and closed ends and external attaching means at the closed end, a tubular piston having open and closed ends and operating with the open end within the open end of the barrel and forming therewith a variable capacity compression and expansion chamber for contained liquid and air, said piston having external attaching means at the closed end of the same, said piston being of less diameter and operating clear of the inner surface of the barrel and bearing lands for the piston fixedly secured in said barrel at the outer, open end and at an intermediate point in the length of the barrel, said bearing lands having smooth finished internal bearing surfaces of fundamentally the same diameter and of less diameter than the internal diameter of the barrel and the tubular piston having a corresponding smooth finished bearing surface of the same diameter and slidingly operating in said finished internal surfaces of said fixedly supported and spaced bearing lands, whereby the only bearing surfaces are the external surface of the piston and the internal surfaces of said fixedly spaced lands, said intermediate bearing land being a prefinished ring of a size insertable in the barrel and said ring being inserted to a selected intermediate position in the barrel, and means securing said prefinished inserted ring fixed to said barrel in said selected position.

RALPH M. HARMON.